F. GAY.
Farm Gate.

No. 56,550. Patented July 24, 1866.

UNITED STATES PATENT OFFICE.

FRANCIS GAY, OF BEDFORD, OHIO.

IMPROVEMENT IN FARM-GATES.

Specification forming part of Letters Patent No. 56,550, dated July 24, 1866.

*To all whom it may concern:*

Be it known that I, FRANCIS GAY, of Bedford, in the county of Cuyahoga and State of Ohio, have invented certain new and useful Improvements in Farm-Gates; and I do hereby declare that the following is a full and complete description of the same, reference being had to the accompanying drawings, making a part of this specification, in which—

Figure 1:
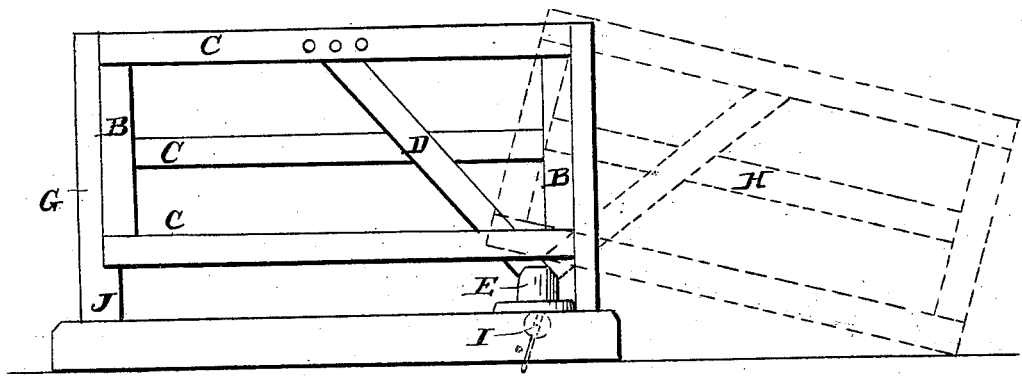
Figure 2:
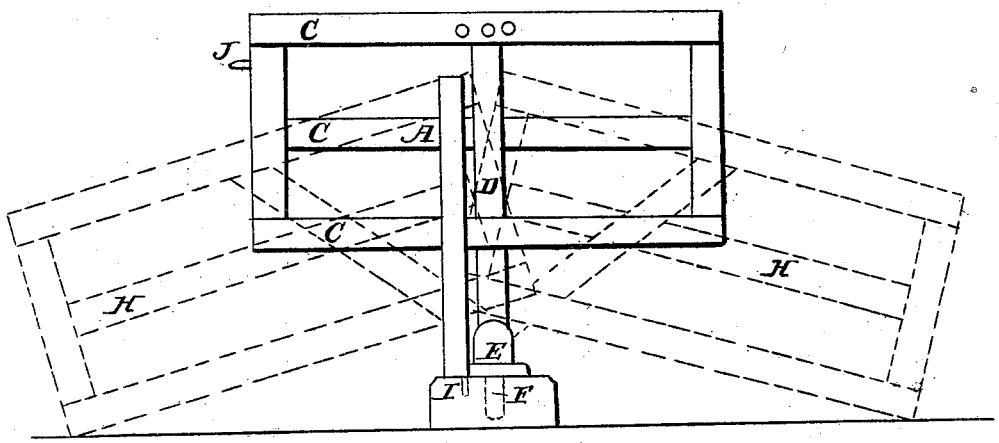

Figure 1 is a side view of the gate when closed; Fig. 2, a view of the gate when open.

Letters of reference refer to like parts in the views presented.

A, Fig. 1, is the gate, and is constructed in the following manner: B B' are pieces of scantling. These pieces form the ends of the gate, and to which the rails or bars C C C are nailed. These bars are five in number, two being at the bottom and at the top of the gate, one only being in the middle. The two upper and the two lower bars are nailed upon each side of the end pieces, for reasons hereinafter referred to.

D is a brace or standard, one end of which is pivoted to the upper bars and midway the length of the gate, while the lower end is pivoted to a revolving standard-pedestal, E, Fig. 1. This pedestal stands upon the platform or sill of the heel of the gate, and is kept from sliding out of place by a pin projecting downward through the platform. This pin is indicated by the dotted line F, Figs. 1 and 2.

G is a post at the head of the gate, and against which the gate falls on being closed.

Having thus described the several parts of the gate and its construction, I will now explain its operation, which is as follows: In order to open the gate, the operator draws it backward from the head-post in the direction of the pedestal. As it is drawn back it is at the same time raised upward by the standard D and supported by it until the standard comes to a perpendicular. The gate is then swung round upon the pedestal lengthwise to the passage-way. In this position it is shown in Fig. 2.

The upper end of the standard being pivoted to the upper bars of the gate and the lower end pivoted to the pedestal, as above stated, permits of the end of the gate being dropped upon the ground in the direction indicated by the dotted lines H, or it may be thrown back in the same manner without turning, if thought best, as indicated by the dotted lines H', Fig. 1.

The reason for elevating the gate in the manner described is for the purpose of avoiding any obstruction that may be in the way, as a bank of earth, snow-drifts, &c., which would prevent an ordinary swing-gate from being open without first clearing away the obstruction.

To facilitate the opening of the gate or turning it when open, a friction-roller, I, is placed under one side of the pedestal, and upon which it rolls on being turned.

To prevent the gate from being pushed open sidewise, a pin, J, is provided. This pin drops into a hole in the head-post, against which the gate falls on being shut, thereby holding the gate securely from all side movement. Also the gate, when closed, is supported by the pedestal E at one end and by a foot-block, J, at the other.

It will be observed that, the gate being thus supported from the bottom, there can be no sagging of the gate or any strain whatever upon the post or head of the gate. The bottom bars of the gate being double, or, as above stated, one on each side of the end pieces, serves as a guide for the standard to move in; also, it prevents the gate from swinging away from the standard, giving thereby to the whole structure greater strength and security.

What I claim as my improvement, and desire to secure by Letters Patent, is—

The standard D, the pedestal E, and the pin or stem F, as arranged, and in combination with the gate A, in the manner and for the purpose herein set forth.

FRANCIS GAY.

Witnesses:
W. H. BURRIDGE,
DANIEL C. GAY.